US010748164B2

(12) United States Patent
Clark et al.

(10) Patent No.: US 10,748,164 B2
(45) Date of Patent: *Aug. 18, 2020

(54) ANALYZING SENTIMENT IN PRODUCT REVIEWS

(71) Applicant: International Business Machines Corporation, Armonk, NY (US)

(72) Inventors: Adam T. Clark, Mantorville, MN (US); Jeffrey K. Huebert, Byron, MN (US); Aspen L. Payton, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,619

(22) Filed: Jan. 3, 2019

(65) Prior Publication Data

US 2019/0139058 A1 May 9, 2019

Related U.S. Application Data

(63) Continuation of application No. 14/930,693, filed on Nov. 3, 2015, now Pat. No. 10,282,737.

(51) Int. Cl.
*G06Q 30/02* (2012.01)
*G06F 16/2457* (2019.01)
*G06F 40/30* (2020.01)

(52) U.S. Cl.
CPC ... *G06Q 30/0201* (2013.01); *G06F 16/24578* (2019.01); *G06F 40/30* (2020.01)

(58) Field of Classification Search
CPC ......... G06Q 10/00; G06Q 40/06; G06Q 40/00

USPC ....................................................... 705/7.29
See application file for complete search history.

(56) References Cited

U.S. PATENT DOCUMENTS

| 7,958,000 | B2 | 6/2011 | Luby et al. |
| 8,396,859 | B2 | 3/2013 | Green et al. |
| 8,417,713 | B1 | 4/2013 | Blair-Goldensohn et al. |
| 8,463,688 | B2 * | 6/2013 | Ritterman ............. G06Q 40/06 705/36 R |
| 8,515,828 | B1 * | 8/2013 | Wolf ..................... G06Q 30/02 705/26.1 |
| 8,533,208 | B2 | 9/2013 | Sundaresan et al. |
| 8,554,601 | B1 | 10/2013 | Marsh et al. |

(Continued)

OTHER PUBLICATIONS

Purcell, R., "Quality Function Deployment: Should the IV House be a Duplex?," an IP.com Prior Art Database Technical Disclosure, IP.com Electronic Publication: Nov. 14, 2002, IP.com No. 000010276, 11 pages, Copyright Kimberly-Clark Corporation, 2002.

(Continued)

*Primary Examiner* — Romain Jeanty
(74) *Attorney, Agent, or Firm* — Nicholas D. Bowman

(57) ABSTRACT

A processor uses natural language processing to ingest product reviews for a plurality of products. Each of the products embodies a specific form for each of the plurality of product features. The processor analyzes the ingested product reviews for sentiments associated with the specific forms. The processor generates a sentiment score for each product feature based on the analysis. The processor ranks the plurality of product features based on the sentiment scores.

20 Claims, 5 Drawing Sheets

(56) References Cited

U.S. PATENT DOCUMENTS

| | | | | |
|---|---|---|---|---|
| 8,600,796 | B1* | 12/2013 | Sterne | G06Q 30/0203 |
| | | | | 705/7.29 |
| 8,671,098 | B2* | 3/2014 | Salvetti | G06Q 30/0278 |
| | | | | 707/738 |
| 8,694,357 | B2 | 4/2014 | Ting et al. | |
| 8,731,995 | B2* | 5/2014 | Sun | G06Q 10/10 |
| | | | | 704/9 |
| 8,818,788 | B1* | 8/2014 | Mihalik | G06F 17/2785 |
| | | | | 704/1 |
| 8,909,771 | B2* | 12/2014 | Heath | G06Q 30/02 |
| | | | | 705/39 |
| 8,965,897 | B2* | 2/2015 | Carbonell | G06F 16/345 |
| | | | | 707/740 |
| 2009/0319342 | A1 | 12/2009 | Shilman et al. | |
| 2011/0040759 | A1* | 2/2011 | Rappoport | G06F 16/3334 |
| | | | | 707/737 |
| 2011/0258560 | A1 | 10/2011 | Mercuri et al. | |
| 2013/0066873 | A1* | 3/2013 | Salvetti | G06Q 30/0278 |
| | | | | 707/738 |
| 2013/0185175 | A1 | 7/2013 | Roozen et al. | |
| 2013/0226925 | A1* | 8/2013 | Carbonell | G06F 16/345 |
| | | | | 707/740 |
| 2013/0332305 | A1 | 12/2013 | Palmer | |
| 2014/0095408 | A1* | 4/2014 | Shen | G06F 17/248 |
| | | | | 705/347 |
| 2014/0172744 | A1 | 6/2014 | El-Hmayssi et al. | |
| 2015/0066711 | A1 | 3/2015 | Chua et al. | |
| 2015/0178279 | A1 | 6/2015 | Chen | |
| 2016/0180438 | A1 | 6/2016 | Boston et al. | |
| 2017/0124575 | A1 | 5/2017 | Clark et al. | |

OTHER PUBLICATIONS

Anonymous, "A Method and Apparatus for Effective Decision Making in Consumer Markets," An IP.com Prior Art Database Technical Disclosure, IP.com Electronic Publication: Sep. 9, 2012, IP.com No. 000221545, 9 pages.

Anonymous, "Unsupervised detection of representative reviewers from Product reviews," An IP.com Prior Art Database Technical Disclosure, IP.com Electronic Publication: Nov. 25, 2013, IP.com No. 000232660, 6 pages.

Anonymous, "Technique of identifying and ranking markdown candidates for retailers," An IP.com Prior Art Database Technical Disclosure, IP.com Electronic Publication: Jul. 25, 2014, IP.com No. 000238008, 13 pages.

Cerami, G., "Product Review Data Provides Pointed Visibility into Customer Sentiment, Product Development and Pricing for Consumer Electronics", Jun. 12, 2014, 5 pages.

Yang et al., "Feature-based Product Review Summarization Utilizing User Score", Journal of Information Science and Engineering 26, 2010, pp. 1973-1990.

Siering et al., "What Drives the Helpfulness of Online Product Reviews? From Stars to Facts and Emotions", 11th International Conference on Wirtschaftsinformatik, Feb. 27-Mar. 1, 2013, pp. 103-118.

Mejova, Y., "Sentiment analysis within and across media streams", Theses and Dissertations, The University of Iowa,Iowa Research Online, May 2012, 190 pages.

IBM, List of IBM Patents or Patent Applications Treated as Related, Jan. 2, 2019, 2 pages.

* cited by examiner www.abcknives.com

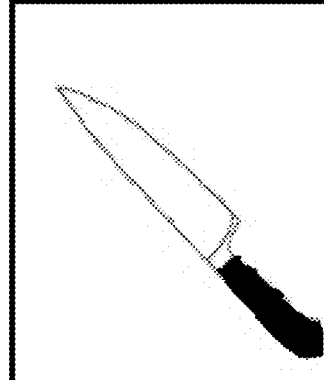

Product Reviews for:
Cut Master Chef's Knife

"At fifteen centimeters, the blade length on this knife has been inadequate for cutting melons from my garden."
-Susie R.

"I've had this knife for ten years. The stainless steel blade material has been great—not even a spot of rust!"
-John M.

410
411
412 www.chopshop.com

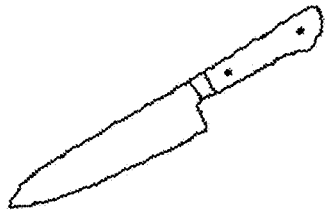

Slicer Brand
Chef's Knife

What our customers are saying:

Mark from Michigan said:
"The fact that the blade material is carbon fiber is fine. The problem is that the twenty-five centimeter blade length makes the knife totally unwieldy."

ANALYZING SENTIMENT IN PRODUCT REVIEWS

BACKGROUND

The present disclosure relates generally to the field of natural language processing, and, more particularly, to using natural language processing in analyzing sentiment in product reviews.

As a field of computer science, natural language processing tends to focus on the interactions between computer systems and human languages. Many modern natural language processing algorithms are derived based on machine learning and rely heavily on statistical inferences. By analyzing a large set of real-world examples of natural language usage, a computer system may be able to glean sets of rules that guide the machine through future analysis of natural language passages.

SUMMARY

Embodiments of the present disclosure include a method for evaluating product features, as well as a computer program product and a system for implementing the method. As part of the method, a processor uses natural language processing to ingest product reviews for a plurality of products. Each of the products embodies a specific form for each of the plurality of product features. The processor analyzes the ingested product reviews for sentiments associated with the specific forms. The processor generates a sentiment score for each product feature based on the analysis. The processor ranks the plurality of product features based on the sentiment scores.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 4 illustrates a diagram including two example web pages containing product reviews that may be utilized in methods described herein, in accordance with embodiments of the present disclosure.

Figure 1:
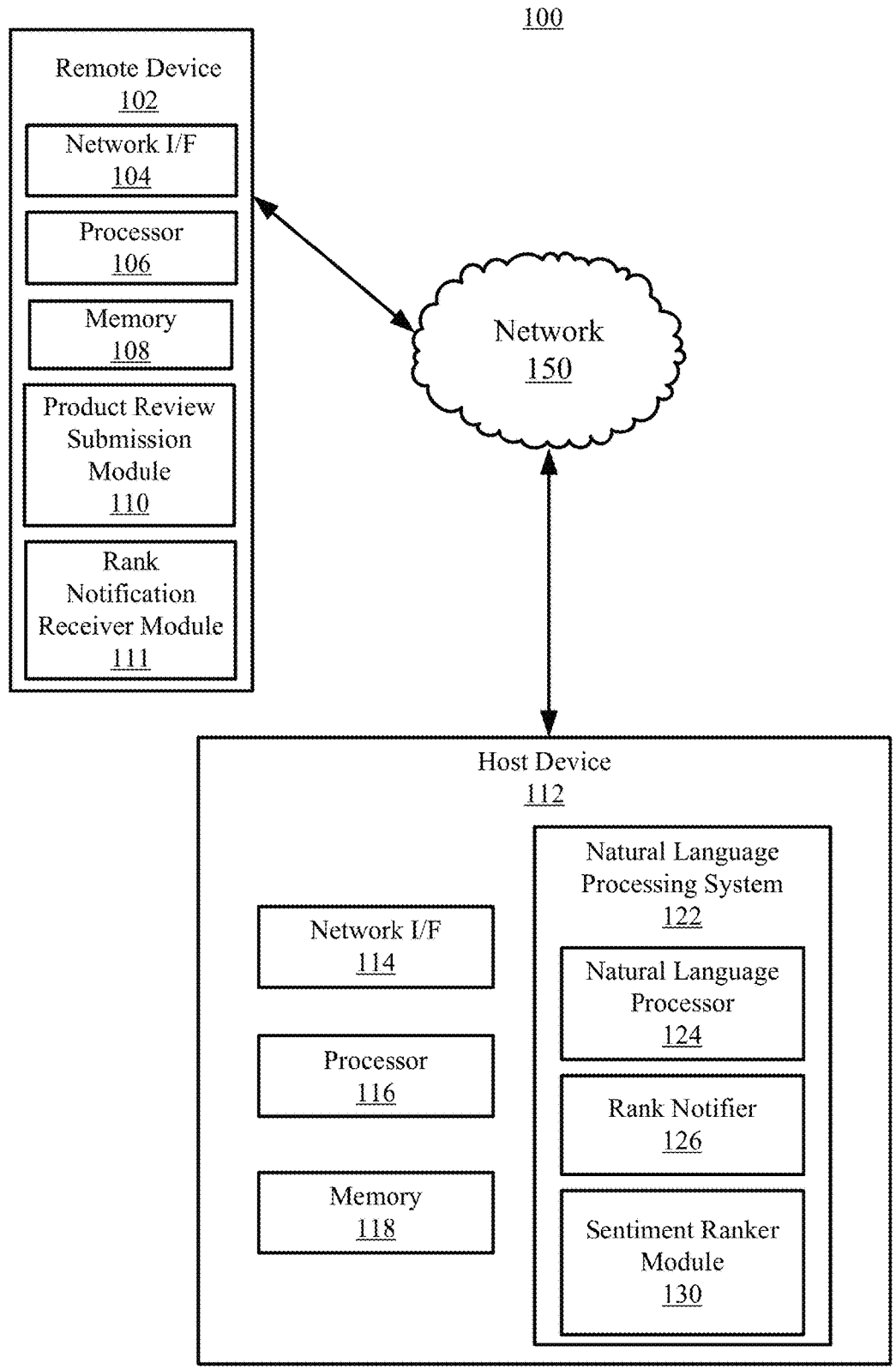
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of natural language processing, and in particular to using natural language processing in analyzing sentiment in product reviews. While the present disclosure is not necessarily limited to such applications, various aspects of the disclosure may be appreciated through a discussion of various examples using this context.

As used herein, a product may refer to an item offered to a market to satisfy consumer demand. In some embodiments, products may include, without limitation, physical items or services. For example, a product may include a motor vehicles for sale or a hotel room for rent.

As used herein, a product review may refer to commentary on a product designed to aid consumers in purchasing decisions relating to the product. A product review may be made by consumers, including previous purchasers of the product, who may or may not be experts in the technology field of the product.

As used herein, a product feature may refer to a type or group of aspects, qualities, or attributes of a product or class/type of products. For example, a motor vehicle may have product features that include engine size, warranty, and cabin space. For a warranty generally, more specific product features may include warranty length or warranty deductible. For another example, a hotel room may have product features that include room rate, room size, and room cleanliness. Furthermore in some embodiments, different products may be considered of the same product type if they have the same or substantially similar product features (which may still have different specific forms).

As used herein, a specific form for a product feature may refer to a specific embodiment of the product feature that is included in the particular product of interest. For example, a specific motor vehicle model could have a specific form of a two-year warranty for the product feature of warranty length. For another example, a first particular hotel room could have a specific form of fifty square meters for the product feature room size, while a second particular hotel room could have a specific form of seventy-five square meters for that same product feature (room size).

As used herein, sentiment may refer generally to attitudes, emotions, and opinions about a particular topic (e.g., a consumer's opinions on a specific form of a particular feature of a product). As contrasted with facts, sentiments tend to be subjective based on the impression of the reviewer (e.g., the consumer writing the product review). In some embodiments, many different categorizations of sentiments may be possible (e.g., a consumer is happy about a specific form of one product feature, angry about a specific form of another product feature, and sad about a specific form of a third product feature). In other embodiments, a binary opposition in sentiments is assumed (e.g., a consumer either likes or dislikes, is for or against, a particular specific form of a product feature) and a sentiment is either positive, negative, or neutral on a spectrum. This may sometimes be referred to as the polarity of the sentiment.

Furthermore, as used herein, the relative extremity of the sentiment (or the relative extremity of the sentiment's polarity) may refer to the strength of a particular sentiment without regard for whether the sentiment is positive or negative. For example, a strongly positive sentiment and a strongly negative sentiment may have the same relative extremity of sentiment, even though they are on opposite ends of the sentiment spectrum. For another example, a medially positive sentiment and a weakly positive sentiment may different relative extremity of sentiment, even though they are on the same end of the sentiment spectrum.

In some situations, it may be common for websites to include product reviews for products that are sold on the website. These reviews can often be of substantial length and there may be dozens, hundreds, or even thousands of reviews for each product. Prospective product purchasers may read these reviews and thereby learn information about each product's features, including each product's strengths and weaknesses.

Even after reading product reviews, however, it still may be difficult for prospective purchasers to discern which aspects of a product are significant. This may be especially true for an inexperienced purchaser who may not know how much certain product features actually matter. For example, a first-time lawn mower buyer may see a couple of reviews that rave about the turn radius of a particular mower. While this may seem like a major positive, the buyer may not know for sure. Specifically, the buyer may not know whether turn radius is even an important feature in lawn mowers (e.g., whether the difference between a good turn radius and a bad turn radius is ever going to actually matter in day-to-day use of the mower).

In some embodiments of the present disclosure, an emphasis may be put on the concept of using sentiment found in product reviews in order to inform prospective purchasers which features are important to consider when buying a particular product or type of product. In determining the relative importance of a feature based on product reviews, factors to consider may include the number/proportion of reviews that mention that feature, whether a sentiment is associated with the feature in the reviews where it is mentioned, and the strength of the expressed sentiment. In evaluating sentiment strength, it may not matter, in some embodiments, whether a sentiment is strongly positive or strongly negative, rather the point may be that stronger sentiment is a sign of more importance for the corresponding product feature. For example, a product review for a screwdriver that states "this screwdriver is very strong" or "this screwdriver bent way too easily" may be equivalent for some purposes, because both reviews may convey the importance of considering tensile strength when buying a screwdriver.

As discussed above, aspects of the disclosure may relate to natural language processing. Accordingly, an understanding of the embodiments of the present disclosure may be aided by describing embodiments of natural language processing systems and the environments in which these systems may operate. Turning now to the figures, FIG. 1 illustrates a block diagram of an example computing environment 100 in which illustrative embodiments of the present disclosure may be implemented. In some embodiments, the computing environment 100 may include a remote device 102 and a host device 112.

Consistent with various embodiments, the remote device 102 and the host device 112 may be computer systems. The remote device 102 and the host device 112 may include one or more processors 106 and 116 and one or more memories 108 and 118, respectively. The remote device 102 and the host device 112 may be configured to communicate with each other through an internal or external network interface 104 and 114. The network interfaces 104 and 114 may be, for example, modems or network interface cards. The remote device 102 and/or the host device 112 may be equipped with a display or monitor. Additionally, the remote device 102 and/or the host device 112 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device 102 and/or the host device 112 may be servers, desktops, laptops, or hand-held devices.

The remote device 102 and the host device 112 may be distant from each other and communicate over a network 150. In some embodiments, the host device 112 may be a central hub from which remote device 102 can establish a communication connection, such as in a client-server networking model. Alternatively, the host device 112 and remote device 102 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote device 102 and the host device 112 may be local to each other and communicate via any appropriate local communication medium. For example, the remote device 102 and the host device 112 may communicate using a local area network (LAN), one or more hardwire connections, a wireless link or router, or an intranet. In some embodiments, the remote device 102 and the host device 112 may be communicatively coupled using a combination of one or more networks and/or one or more local connections. For example, the first remote device 102 may be hardwired to the host device 112 (e.g., connected with an Ethernet cable) while a second remote device (not shown) may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote device 102 may enable users to submit (or may submit automatically with or without user input) electronic documents (e.g., web pages) containing product reviews to the host devices 112 in order to have the product reviews ingested and analyzed for sentiment (e.g., by natural language processing system 122). For example, the remote device 102 may include product review submission module 110 and a user interface (UI). The product review submission module 110 may be in the form of a web browser or any other suitable software module, and the UI may be any type of interface (e.g., command line prompts, menu screens, graphical user interfaces). The UI may allow a user to interact with the remote device 102 to submit, using the product review submission module 110, one or more web pages containing product reviews about various products to the host device 112. In some embodiments, the product review submission module 110 may incorporate a web crawler or other software that allows the module to search for and automatically identify product reviews for submission to the host device 112. In some embodiments, product reviews for different products of the same type may be submitted together in a single group.

In some embodiments, the product reviews being submitted via the product review submission module 110 may all belong to (or may have all been created on a website that is owned by) the same entity that is submitting them for analysis. This may occur, for example, when a retail website submits customer product reviews that were provided directly to the retail website by customers who shopped there. In some other embodiments, the entity submitting the product reviews may be different from the entity that originally received (e.g., collected) the product reviews from consumers. This may occur, for example, when a retail website obtains product reviews from a third party (e.g., a consumer survey company), for free or for a fee, and then submits these reviews for analysis.

In some embodiments, the remote device 102 may further include a rank notification receiver module 111. This module may be configured to receive notifications, from the host device 112, of the relative ranks of various product features common to a group of products. In some embodiments, these relative ranks may then be used by the remote device 102 to aid prospective purchasers in determining which product features are more important to consider when selecting among a group of competing products. For example, these rankings may incorporated (by either the remote device 102 or the host device 112) into web pages that allow consumers to use these received rankings for sorting through products for purchase.

In some embodiments, the host device 112 may include a natural language processing system 122. The natural language processing system 122 may include a natural language processor 124, a rank notifier 126, and a sentiment ranker module 130. The natural language processor 124 may include numerous subcomponents, such as a tokenizer, a part-of-speech (POS) tagger, a semantic relationship identifier, and a syntactic relationship identifier. An example natural language processor is discussed in more detail in reference to FIG. 2.

In some embodiments, the sentiment ranker module 130 may be configured to rank product features based on an analysis of the sentiment associated with ingested and annotated product reviews. In addition, the rank notifier 126 may be connected to the sentiment ranker module 130 and may serve to notify a user at the remote system 102 (e.g., via the rank notification receiver module 111) of the relative ranks of product features.

In some embodiments, the natural language processing system 122 may further include a search application (not shown). The search application may be implemented using a conventional or other search engine, and may be distributed across multiple computer systems. The search application may be configured to search one or more databases or other computer systems for product reviews that are related to a target group of products. For example, the search application may be configured to search a corpus of information related to product reviews previously submitted by the product review submission module 110 in order to identify additional relevant product reviews.

While FIG. 1 illustrates a computing environment 100 with a single host device 112 and a single remote device 102, suitable computing environments for implementing embodiments of this disclosure may include any number of remote devices and host devices. The various modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to ingest and annotate product reviews, and the second host device may include a software module configured to compare and rank product features based on the ingested product reviews.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
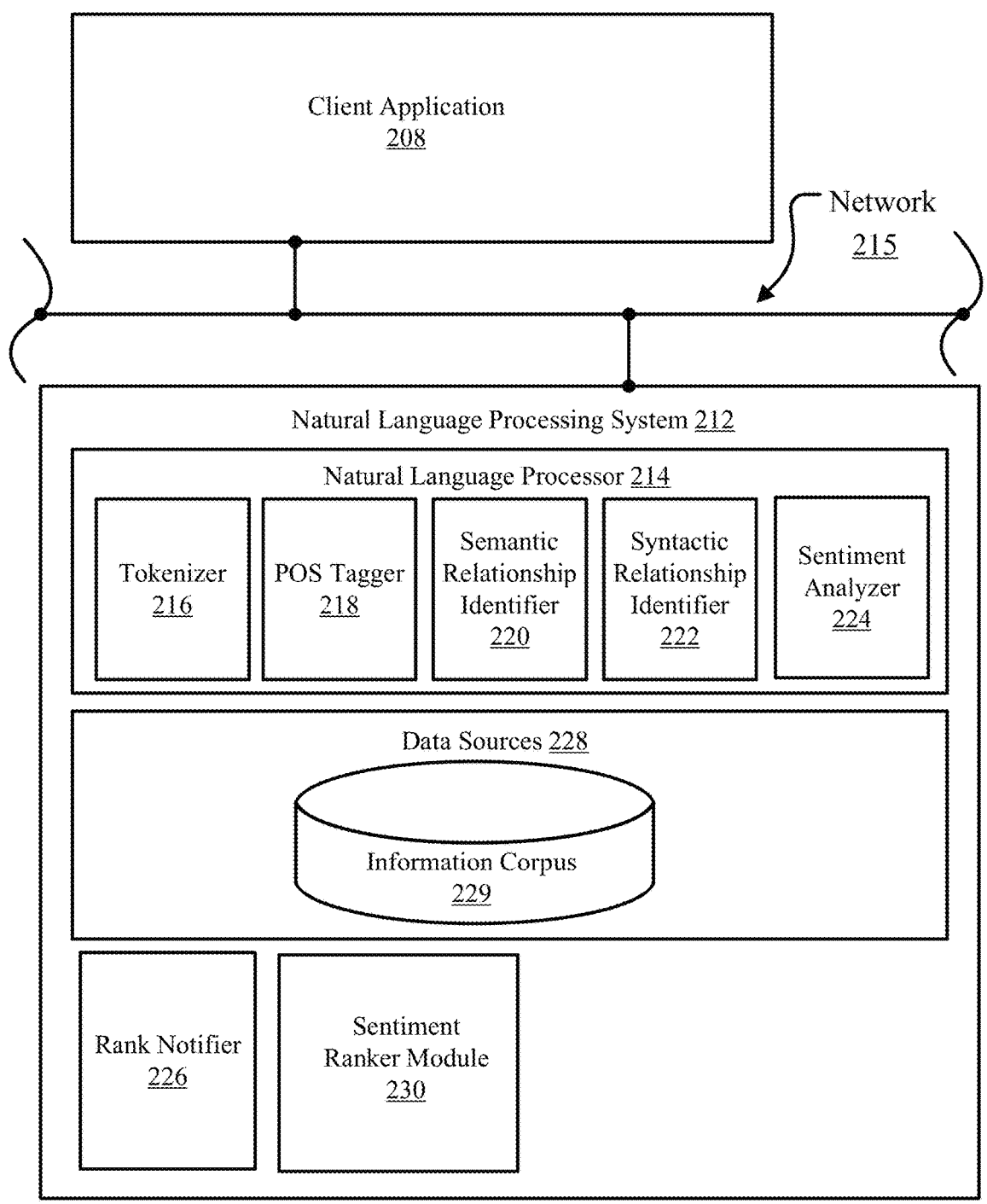
FIG. 2 illustrates a block diagram of an exemplary system architecture, including a natural language processing system, configured to use product reviews to rank product features, in accordance with embodiments of the present disclosure.

Referring now to FIG. 2, shown is a block diagram of an exemplary system architecture 200, including a natural language processing system 212, configured to use product reviews to rank product features, in accordance with embodiments of the present disclosure. In some embodiments, a remote device (such as remote device 102 of FIG. 1) may submit electronic documents or webpages (containing product reviews to be analyzed) to the natural language processing system 212 which may be housed on a host device (such as host device 112 of FIG. 1). Such a remote device may include a client application 208, which may itself involve one or more entities operable to generate or modify information in the webpages that are then dispatched to a natural language processing system 212 via a network 215.

Consistent with various embodiments, the natural language processing system 212 may respond to electronic document submissions sent by the client application 208. Specifically, the natural language processing system 212 may analyze a received product reviews to aid in the analysis of the relative importance of product features for consumer consideration. In some embodiments, the natural language processing system 212 may include a natural language processor 214, data sources 228, a rank notifier 226, and a sentiment ranker module 230.

The natural language processor 214 may be a computer module that analyzes the received product reviews and other electronic documents. The natural language processor 214 may perform various methods and techniques for analyzing electronic documents (e.g., syntactic analysis, semantic analysis, etc.). The natural language processor 214 may be configured to recognize and analyze any number of natural languages. In some embodiments, the natural language processor 214 may parse passages of the documents. Further, the natural language processor 214 may include various modules to perform analyses of product reviews. These modules may include, but are not limited to, a tokenizer 216, a part-of-speech (POS) tagger 218, a semantic relationship identifier 220, a syntactic relationship identifier 222, and sentiment analyzer 224.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one product review may shed light on the meaning of text elements in another product review, particularly if they are reviews of the same product). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by other components of the natural language processing system 212.

In some embodiments, the semantic relationship identifier 220 may be a computer module that is configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that is configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

Consistent with various embodiments, the sentiment analyzer 224 may be a computer module that is configured to identify and categorize the sentiments associated with tokens of interest. In some embodiments, the sentiment analyzer may be configured to identify, within text passages, and annotate keywords that are preselected as high quality indicators of sentiment polarity (e.g., indicators of positive sentiment could include brilliant, excellent, or fantastic). Various tools and algorithms may be used the sentiment analyzer 224 as are known to those skilled in the art (e.g., Naïve Bayes lexical model).

In some embodiments, the natural language processor 214 may be a computer module that may parse a document and generate corresponding data structures for one or more portions of the document. For example, in response to receiving a set of product reviews from a website that includes a collection of consumer product reviews at the natural language processing system 212, the natural language processor 214 may output parsed text elements from the product reviews as data structures. In some embodiments, a parsed text element may be represented in the form of a parse tree or other graph structure. To generate the parsed text element, the natural language processor 214 may trigger computer modules 216-224.

In some embodiments, the output of the natural language processor 214 may be stored as an information corpus 229 in one or more data sources 228. In some embodiments, data sources 228 may include data warehouses, information corpora, data models, and document repositories. The information corpus 229 may enable data storage and retrieval. In some embodiments, the information corpus 229 may be a storage mechanism that houses a standardized, consistent, clean, and integrated copy of the ingested and parsed product reviews. Data stored in the information corpus 229 may be structured in a way to specifically address analytic requirements. For example, the information corpus 229 may store the ingested product reviews based on groups of related products (e.g., products of the same type) in order to make ranking product features easier. In some embodiments, the information corpus 229 may be a relational database.

In some embodiments, the natural language processing system 212 may include a sentiment ranker module 230. The sentiment ranker module 230 may be a computer module that is configured to generate sentiment scores for specific forms of product features based on the analysis of annotated product reviews. The sentiment ranker module 230 may be further configured to rank the product features based on these sentiment scores.

The rank notifier 226 may be a computer module that is configured to notify users of product features rankings determined by the sentiment ranker module 230. In some embodiments, the rank notifier 226 may communicate with a rank notification receiver module (such as module 111 of FIG. 1).

Figure 3:
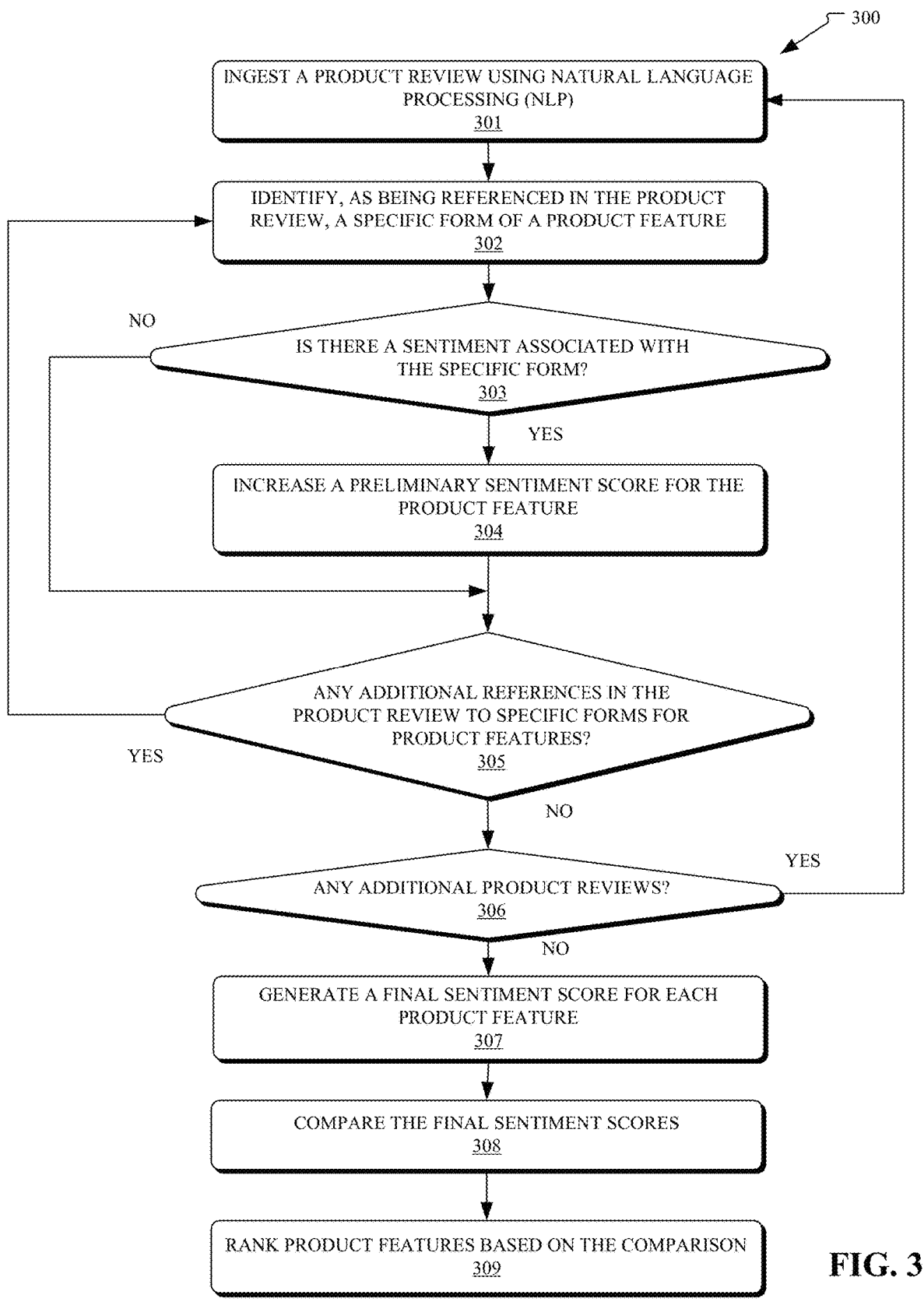
FIG. 3 illustrates a flowchart of an example method for evaluating product features, in accordance with embodiments of the present disclosure.

FIG. 3 illustrates a flowchart of an example method 300 for evaluating product features, in accordance with embodiments of the present disclosure. The method 300 may be performed by a computer system (or more specifically, a processor thereof), such as the host device 112 (shown in FIG. 1). In some embodiments, reviews of products of the same type or class may be analyzed together (and separate from reviews of other types of products) in an iteration of the method 300. By grouping products of the same type together, the computer system may be able to produce relative feature importance measurements that are less biased toward a particular product and more focused on what is important for that type of product. In some embodiments, the product reviews analyzed together may be for a plurality of non-identical, competing products of the same type, with multiple reviews for each product. Furthermore, in some embodiments, each product may have a different specific form for each product feature as compared to the other products.

The method 300 may begin at operation 301, wherein the computer system may ingest content of a product review using natural language processing modules. Natural language processing, as discussed herein, may incorporate any relevant natural processing techniques including, without limitation, those techniques discussed in reference to modules 216-224 in FIG. 2. For example, in embodiments, the natural language processing techniques may include analyzing syntactic and semantic content in the product reviews. The natural language processing techniques may be configured to parse structured data (e.g., tables, graphs) and unstructured data (e.g., textual content containing words, numbers). In certain embodiments, the natural language processing techniques may be embodied in software tools or other programs configured to analyze and identify the semantic and syntactic elements and relationships present in and between the product reviews. More particularly, the natural language processing techniques can include parsing the grammatical constituents, parts of speech, context, and other relationships (e.g., modifiers) of the product reviews. The natural language processing techniques can be configured to recognize keywords, contextual information, and metadata tags associated with words, phrases, or sentences related to concepts (e.g., product features, words implying sentiments, etc.). The syntactic and semantic elements can include information such as word frequency, word meanings, text font, italics, hyperlinks, proper names, noun phrases, parts-of-speech, or the context of surrounding words. Other syntactic and semantic elements are also possible.

After ingesting the content of the product review at operation 301, the computer system may, in operation 302, identify, as being referenced in the product review, a first specific form of a first product feature of the product under review. In some embodiments, this may involve identifying a word or phrase in the product review that was previously annotated with a "product feature" tag by a natural language processor module configured to recognize words that indicate specific forms of product features.

Per operation 303, the computer system may determine whether there is a sentiment within the product review that is associated with the identified first specific form. If not, then the method may proceed to operation 305. If, however, there is a sentiment associated with the first specific form, then, per operation 304, a preliminary sentiment score for the first product feature may be increased. As used herein, a sentiment score may refer to a measure or indicator of the amount of sentiment that product reviewers associate with a particular product feature. In some embodiments, a higher sentiment score may indicate (1) that more reviewers have indicated a sentiment associated with one or more specific forms of that product feature and/or (2) that reviewers have indicated stronger sentiments (e.g., more strongly negative or more strongly positive sentiments) associated with the one or more specific forms of that product feature. Furthermore, in some embodiments, each sentiment score may be a measure of relative importance for an associated product feature as compared to other product features and not a measure of relative importance for one specific form of the associated product feature as compared to other specific forms of the associated product feature.

In some embodiments, the general tone of particular product review or a particular reviewer may be taken into account by the computer system in determining how much weight should be given to any particular product review. For example, if a reviewer (in a particular review or in general) tends to have strong feelings about many or all features, then the fact that the reviewer has a strong feeling about a particular specific form of a product feature may not be weighed as heavily (i.e., may affect the preliminary product feature score to a lesser extent). On the other side, a strong sentiment by another reviewer who tends to be more neutral in tone may be more significant. For example, a television review that states that "the picture is terrible, the sound is terrible, and the reception is awesome" might be given less weight when evaluating the importance of the sound quality product feature than a second television review that states that "the picture is fine, the sound is terrible, and the reception is fine." Furthermore, in some embodiments, the general tone of reviewers may be tracked across many product reviews by, for example, tracking the reviewer's username.

In some embodiments, operations 302 and 303 be performed, at least in part, by parsing the product reviews to identify subject-predicate pairings. This may involve analyzing parse trees generated by a natural language processor, such as the natural language processor 214 (shown in FIG. 2). The subject and predict in the sentence may be used to identify a specific form of a product feature (subject) and a text element indicating sentiment about the specific form (predict). For example, a sentence in a product review of a smart phone might read "The camera on this smart phone is terrible." A natural language processing system may parse this sentence to identify a subject ("camera on this smart phone") and a predict ("terrible"). Based on the parsing, the natural language processing system may determine the product feature's specific form (i.e., the particular camera on this smart phone) is associated with strongly negative sentiment.

Subsequent to operation 304, or subsequent to operation 303 if operation 304 is bypassed, the computer system may, per operation 305, determine whether there are any additional references in the product review to specific forms for product features. For each additional reference in the review, operations 302-304 may be repeated as applicable. In some situations, a single product review may have several references to several different specific forms of product features included in a single product being reviewed.

Once there are no further additional references to specific forms to be analyzed in the product review, the computer system may, per operation 306, determine whether there are any additional product reviews to be analyzed. For each such additional product review, operations 301-305 may be repeated as applicable. In some embodiments, several product reviews may be processed by the computer system contemporaneously, for example, when an entire retail website containing many product reviews is selected for analysis.

Once all of the applicable product reviews have been analyzed, the computer system may, per operation 307, generate a final sentiment score for each product feature based on the preliminary sentiment scores that were updated in one or more iterations of operation 304. In some embodiments, the sentiment score for each product feature may be dependent upon a relative proportion of product reviews that incorporate a sentiment associated with a specific form for that particular product feature. For example, a first product feature that has one or more specific forms opined about in fifty percent of analyzed product reviews may have a higher sentiment score that a second product feature that has one or more specific forms opined about in only twenty percent of the analyzed product reviews.

Per operation 308, the computer system may compare the final sentiment scores to each other. Per operation 309 and based on the comparison, the computer system may rank the product features. In some embodiments, the ranking of the product features may be done by sorting the product features into different categories depending on sentiment score (e.g., product features with high sentiment scores, product features with middling sentiment scores, and product features with low sentiment scores). In some embodiments, the ranking of product features may be done by providing the product features and the sentiment scores together in a group so that a reviewer may easily determine, by reviewing the sentiment scores, which product features rank higher than others.

Upon completion of the method 300, the product feature ranking may be used for a variety of purposes to inform consumer purchasing decisions. For example, the rankings may be used to aid prospective purchasers in determining which product features are more important to consider when selecting among a plurality of products. This may include causing the ranking of the product features to be published to a publicly available forum, such as a website hosted by the remote device 102 of FIG. 1. In some embodiments, these product feature rankings may be used in ranking products, for example, on retail websites. In some embodiments, in addition to the rankings themselves, the evidence (e.g., annotated product reviews) that the computer system used determine and support the rankings may also be provided. As provided, this evidence may allow the consumers to see specific details that explain why certain features were ranked higher than other features.

While example embodiments of the method 300 are described herein, many additional embodiments are also contemplated. For example, in some embodiments, additional operations may be performed by the computer system in order to identify (e.g., define) product features to be ranked. This may be necessary in situations where there is not a clear delineation between product features. In some embodiments, the computer system may determine the categories of product features by obtaining a list of product features to use from a system administrator or subject matter expert (e.g., a vacuum cleaner expert might provide a list of six product features that generally applicable to vacuum cleaners). In other embodiments, the computer system may determine the categories of product features only after analyzing a number product reviews about a type of product. In delineating among product features, the computer system may use techniques such as clustering, fuzzy logic, and concept matching to define product feature groupings.

Furthermore, in some additional embodiments of the method 300, the proportion of times that one or more specific forms for a product feature is mentioned in a product review may increase the sentiment score for that product feature even when there is no sentiment (or only neutral sentiment) associated with the specific form in the product review. For example, consider a phrase taken from an example product review: "The fact that the hotel room had a Jacuzzi tub was okay." In this example, the hotel room may be considered the product, bathing facilities may be considered the product feature, and the Jacuzzi tub may be considered the specific form of the product feature. Here, even though the sentiment about the specific form may be considered neutral (because the Jacuzzi tub is said to be okay), the fact that the Jacuzzi tub was even mentioned in the product review may cause the sentiment score for the product feature (bathing facilities) to be increased. This increase, however, may be less than it would be if there was stronger sentiment associated with the Jacuzzi tub.

FIG. 4 illustrates a diagram including two example web pages 410, 420 containing product reviews that may utilized in methods described herein, in accordance with embodiments of the present disclosure. In this example scenario, the first web page 410 is used by a first company (ABC Knives) that sells a variety of kitchen knives. As shown, the first web page 410 includes two consumer product reviews 411, 412 for the Cut Master chef's knife. The second web page 420 is used by a second company (Chop Shop) that sells a competing chef's knife, called the Slicer Brand chef's knife. The second web page 420 includes a consumer product review 421 for the Slicer Brand knife.

As described herein, the product reviews 411, 412, and 421 may be analyzed in order to evaluate what product features a consumer should consider when buying a chef's knife. The evaluation may begin with a remote device (such as remote device 102 of FIG. 1) identifying the two web pages 410, 420 on a search for product reviews about kitchen knives. The remote device may submit the web pages 410, 420 (e.g., via a product review submission module 110 of FIG. 1) to a host device (such as host device 112 of FIG. 1).

Upon receiving the web pages 410, 420, the host device may perform one or more operations of the method 300 described in reference to FIG. 3. Specifically, the host device may (e.g., per operation 301 of FIG. 3) use a modules of a natural language processor (e.g., natural language processor 214 of FIG. 2) to ingest and annotate the first product review 411. Then, by analyzing the ingested first product review 411, the host device may determine (e.g., per operation 302 of FIG. 3) that a first specific form, fifteen centimeters, for a first product feature, blade length, is referenced in the first review 411. The host device may determine (e.g., per operation 303 of FIG. 3) that there is a sentiment associated with the fifteen centimeter blade length. Specifically, the host device may make this determination based on identifying the association between the mention of the blade length (the subject of the sentence) and the use of the word "inadequate" (the predict of the sentence and a known indicator of negative sentiment) within the first review 411. Based on the sentiment discovered in the first review 411, the host device may increase a preliminary sentiment score for the blade length product feature (e.g., per operation 304 of FIG. 3) from zero points to one point.

Continuing the example scenario, upon determining (e.g., per operation 305 of FIG. 3) that there are no additional references to product features in the first review 411, the host device may identify and ingest (e.g., per operations 306 and 301 of FIG. 3) the second product review 412. The host device may determine (e.g., per operation 302 of FIG. 3) that a first specific form, stainless steel, for a second product feature, blade material, is referenced in the second review 412. The host device may also determine (e.g., per operation 303 of FIG. 3) that there is a sentiment associated with the stainless steel blade material, as indicated by the word "great." Based on these determinations about the second review 412, the host device may increase a preliminary sentiment score for the blade material product feature (e.g., per operation 304 of FIG. 3) from zero points to one point.

Further continuing the example scenario, upon determining (e.g., per operation 305 of FIG. 3) that there are no additional references to product features in the second review 412, the host device may identify and ingest (e.g., per operations 306 and 301 of FIG. 3) the third product review 421. The host device may determine (e.g., per operation 302 of FIG. 3) that a second specific form, carbon fiber (as opposed to stainless steel for the Cut Master chef's knife), for the blade length product feature is referenced in the third review 421. The host device may also determine (e.g., per operation 303 of FIG. 3) that there is, however, no sentiment associated with the carbon fiber blade material, because the word "fine" is neutral. Accordingly, the host device may not re-increase the preliminary sentiment score for blade material, which may remain at a score of one point.

Next, the host device may identify (e.g., per operations 305 and 302 of FIG. 3) a second reference to a product feature in the third review 421. Specifically, the host device may determine that a second specific form, twenty-five centimeters, for the blade length product feature is also referenced in the third review 421. The host device may also determine (e.g., per operation 303 of FIG. 3) that there is a sentiment associated with the twenty-five centimeter embodiment of the blade length product feature, as indicated by the phrase "totally unwieldy." Based on these determinations about the third review 421, the host device may increase the preliminary sentiment score for the blade length product feature (e.g., per operation 304 of FIG. 3) from one point to two points.

Continuing the example scenario further, the host device may determine (e.g., per operations 305 and 306) that there are no additional product features referenced in the third review 421 and that there are no additional product reviews to be ingested. Accordingly, the host device may generate (e.g., per operation 307 of FIG. 3) a final sentiment score for all of the product features (of chef's knives) that have been reviewed. Specifically, a final sentiment score of one point may be generated for the blade material product feature and a final sentiment score of two points may be generated for the blade length product feature. The host device may compare the final sentiment scores (e.g., per operation 308 of FIG. 3) and rank, based on the comparison, the blade length product feature above the blade material product feature (e.g., per operation 309 of FIG. 3).

In some embodiments, this set of chef's knife product feature rankings may be used to help consumers determine which product features are more important to consider when they are shopping for a chef's knife. Further, in some embodiments, these knife rankings may not indicate (or even be intended to indicate), at least directly, whether one particular chef's knife is better than other. More specifically, these rankings may be intended to indicate that blade length (because of its higher score) is more important to consider that blade material when buying a chef's knife, while, on the other side, these rankings may not be intended to indicate that a fifteen centimeter blade is better than a twenty-five centimeter blade, or vice versa.

After the chef's knife rankings are generated, they may be transmitted from the host device to a remote device (e.g., via the rank notifier 126 and rank notification receiver module 111 of FIG. 1). The remote device may then use these rankings, in one form or another, to inform consumer purchasing decisions about chef's knives.

It is noted that the three reviews 411, 412, and 421 described in reference to FIG. 4 all explicitly state both the product features and specific forms at issue in the review. This is done for the sake of clarity only and may not apply to all embodiments. In some embodiments, one or both of the product feature or the specific form (and potentially even the product itself) may only be implied by the product review or the context in which it is displayed or may be left unexpressed altogether. For example, a product review may state the product feature only, leaving the specific form undescribed (e.g., "the hotel room price was too high" or "the vehicle's engine's size was too small"). For another example, a product review may state the specific form only and leave the product feature implicit (e.g., "$250 is too much to pay for a hotel room" or "a 1.4 liter engine is too small"). In either situation, a computer system, according to some embodiments, may be able to either infer the product feature or the specific form from the context of the review (e.g., where the review was located on a web page, the statements found in related reviews, etc.). Furthermore, in some embodiments, the computer system may be able to evaluate a product review without ever determining the specific form of the product feature being reviewed. For example, if a review states about a golf club that "the club length is too short", then the computer system may be able to infer a negative sentiment about the specific form of the club length embodied in that particular club, without ever learning the actual value (e.g., club length in centimeters) of that specific form.

Figure 5:
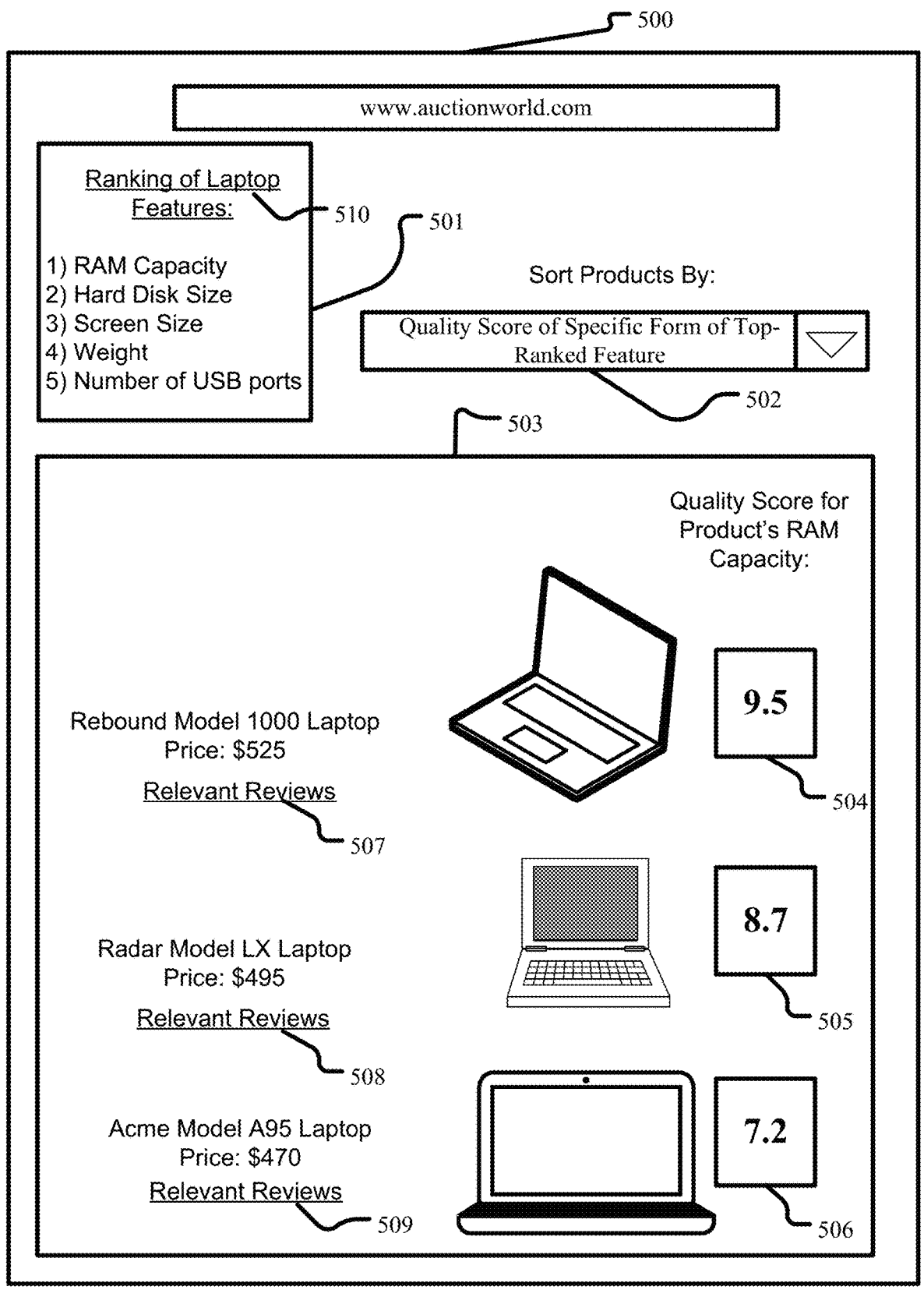
FIG. 5 illustrates a diagram including an example auction web page utilizing product feature rankings to aid consumer purchasing decisions, in accordance with embodiments of the present disclosure.

FIG. 5 illustrates a diagram including an example auction web page 500 utilizing product feature rankings to aid consumer purchasing decisions, in accordance with embodiments of the present disclosure. In this example, the web page 500 is for an online retail company (Auction World) that sells laptop computers. As shown the web page 500 includes listed rankings 501, drop down menu 502, and product display portion 503.

The listed rankings 501 display a ranking of laptop features generated, for example, by a computer system performing operations of the method 300 of FIG. 3. In some embodiments, the listed rankings 501 may have been generated by the same entity that owns the web page. In other embodiments, the listed rankings 501 may have been generated by a third party that specializes in obtaining and analyzing product reviews from numerous sources for sentiment. In this example, according to the listed rankings, the most import feature for prospective laptop purchasers to consider is RAM capacity and the least important feature (of those that are ranked) is the number of USB ports in the laptop.

As shown, the example drop down menu 502 allows visitors to the web page 500 to select how they want the laptops to be sorted in the product display portion 503. In this instance, the visitor has selected to sort (e.g., filter) the products by the quality score of the specific form of the top-ranked feature (i.e., RAM capacity, in this instance). In some embodiments, a quality score for a specific form may be generated based on the quantity or quality of the product feature as embodied in the particular product being scored. For example, a laptop with 100 GB hard drive may have a higher quality score for the hard disk size product feature than a competing laptop with only a 50 GB hard drive.

In some embodiments, quality scores may be generated based on the same product reviews that are used to generate product feature rankings. This may include, for example, a computer system analyzing the sentiment associated with a specific form of a product feature not only for determining whether to increase the preliminary sentiment score for the product feature (as is described in operations 303 and 304 of FIG. 3), but also for the purpose of determining whether to increase or decrease a preliminary quality score for the specific form (e.g., with positive sentiment causing the preliminary quality score to increase and negative sentiment causing the preliminary quality score to decrease). In other embodiments, quality scores may be generated based on expert opinions about the product of interest.

As shown, the product display portion 503 shows three laptops that are ranked according to their quality scores 504, 505, and 506 for the RAM capacity product feature. Specifically, the Rebound Model 1000 Laptop has a RAM capacity quality score of 9.5 (highest), the Radar Model LX Laptop has a RAM capacity quality score of 8.7, and the Acme Model A95 Laptop has a RAM capacity score of 7.2 (lowest). In this example, the visitor may use these rankings in determining which of the three laptops should be purchased.

As shown, the example auction web page 500 also includes four hyperlinks 507, 508, 509, and 510. Of these, hyperlinks 507-509 are labeled as "Relevant Reviews" and may be used to provide visitors to the page 500 with access to the underlying evidence that a computer system used to derive the quality scores 504-506 for each of the three displayed products. For example, hyperlink 507 may provide a link to a separate window that is populated with forty consumer product reviews wherein the reviewer's all wrote very positively about the RAM capacity of the Rebound Model 1000 Laptop, which caused its quality score 504 to be high. For another example, hyperlink 509 may provide a link to a separate webpage that includes an expert opinion giving only a middling review to the RAM capacity of the Acme Model A95 Laptop, which caused its quality score 506 to be middling.

The fourth hyperlink 510 on the web page 500 may be used to provide visitors with access to the underlying evidence that a computer system (e.g., the computer system performing operations of the method 300 of FIG. 3) used to derive the listed rankings 501. For example, hyperlink 510 may provide a link to a database that includes laptop product reviews sorted by sentiment about specific forms of product features referenced in each review. A quick glance through the database by the visitor may reveal that there are several hundred laptop product reviews that include sentiment about specific forms of RAM capacity but only a couple product reviews that include sentiment about specific forms of the number of USB ports.

While in the depicted example, only the quality scores of the top-ranked feature are used to rank the products, other product ranking schemes employing other filter criteria are also possible. For example, in some embodiments, the quality scores for all of the ranked product features may be used as the criteria for filtering the products, with the higher-ranked product features counting for more relative weight. For example, in some embodiments, a visitor may adjust the preferences on the web page to indicate that only products having a minimum level of quality (e.g., quality score) for a particular product feature ranked as important should be displayed to the visitor.

In some embodiments, a potential purchaser on a website may be able adjust the product filter criteria in other ways as well. For example, an option may be included in a web page to allow the potential purchaser to select which product features he thinks are important and then the rest of the product features may be re-ranked accordingly. This may be useful in situations where product feature rankings in the abstract are different than the corresponding rankings where a given product feature is predetermined (e.g., based on user selection) as important to purchaser consideration. For example, in one scenario product feature A may normally be relatively unimportant, but given that a particular purchaser has indicated that product feature B is important to him (or has been detected by a computer system as being biased towards products that have high quality specific forms of product feature B), the objective relative importance of product feature A may increase substantially for that particular purchaser's purposes. In some embodiments, the potential purchaser may be notified of change in importance (e.g., by a banner on the website saying "people who thought that product feature B was important also thought that product feature A was important"). In some embodiments, the determination of which product features are associated with other product features may be done by a computer system that does intra-review analysis on individual product reviews to determine which features are often correlated together by individual reviewers (e.g., the computer system may determine that fifty percent of product reviewers who had strong sentiment about the specific form of product feature B also had strong sentiment about the specific form of product feature A).

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the foregoing detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the foregoing description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for evaluating a plurality of product features, the method comprising:
   ingesting, by a processor using natural language processing, product reviews for a plurality of products, wherein each product embodies a specific form for each of the plurality of product features, wherein the ingesting, by the processor using natural language processing, the product reviews comprises:
      converting, by a tokenizer running on the processor, sequences of characters within the product reviews into sequences of tokens by identifying word boundaries in the product reviews;
      determining, by a part-of-speech tagger running on the processor, a part of speech for each token and marking each token with its part of speech;
      identifying, by syntactic relationship identifier running on the processor, syntactic relationships amongst the tokens; and
      generating, by the processor and based on the identified syntactic relationships, parse trees for the product reviews;
   analyzing, by the processor, the ingested product reviews for sentiments associated with the specific forms;
   generating, based on the analyzing and by the processor, a sentiment score for each product feature; and
   ranking, based on the sentiment scores and by the processor, the plurality of product features.

2. The method of claim 1, wherein the ranking indicates a relative importance of each of the plurality of product features to prospective purchaser consideration.

3. The method of claim 1, wherein the analyzing the ingested product reviews for the sentiments associated with the specific forms comprises:
   analyzing, by the processor, the generated parse trees to identify associations between subject specific forms and predicate sentiments.

4. The method of claim 1, wherein the plurality of products are non-identical, competing products, wherein the product reviews include a plurality of product reviews for each non-identical, competing product, and wherein the sentiments associated with the specific forms are analyzed for relative extremity of polarity.

5. The method of claim 1, further comprising:
   aiding prospective purchasers in determining which of the product features are more important to consider when selecting among the plurality of products by causing the ranking of the product features to be published to a publicly available forum.

6. The method of claim 1, wherein the analyzing the ingested product reviews comprises:
   identifying, in an ingested product review for a first product embodying a first specific form for a first product feature, a relatively strong positive sentiment associated with the first specific form; and
   identifying, in an ingested product review for a second product embodying a second specific form for the first product feature, a relatively strong negative sentiment associated with the second specific form,
   wherein the relatively strong positive sentiment and the relatively strong negative sentiment both cause a sentiment score for the first product feature to be higher.

7. The method of claim 1, wherein each sentiment score is a measure of relative importance for an associated product feature as compared to other product features and not a measure of relative importance for one specific form of the associated product feature as compared to other specific forms of the associated product feature.

8. The method of claim 1, wherein the sentiment score for each product feature is dependent upon a relative proportion of the product reviews that incorporate a sentiment associated with a specific form for that product feature.

9. The method of claim 1, further comprising:
   identifying a highest-ranking product feature from the ranked plurality of product features;
   generating a quality score for each product based on a specific form of the highest-ranking product feature embodied within that product;
   ranking, based on quality score, the plurality of products; and
   publishing each quality score in association with evidence relied upon to generate the quality score.

10. The method of claim 1,
    wherein the ingesting the product reviews comprises ingesting a first product review for a first product, the first product including a first specific form for a first product feature and a second specific form for a second product feature,
    wherein the ingesting the product reviews further comprises ingesting a second product review for a second product, the second product including a third specific form for the first product feature and a fourth specific form for the second product feature,
    wherein the analyzing the ingested product reviews comprises determining that the first product review has a first polarity of sentiment associated with the first specific form and a second polarity of sentiment associated with the second specific form,
    wherein the analyzing the ingested product reviews further comprises determining that the second product review has a third polarity of sentiment associated with the third specific form and a fourth polarity of sentiment associated with the fourth specific form,
    wherein the generating the sentiment score for each product feature comprises generating a first sentiment score for the first product feature based on the first polarity of sentiment and the third polarity of sentiment,
    wherein the generating the sentiment score for each product feature further comprises generating a second sentiment score for the second product feature based on the second polarity of sentiment and the fourth polarity of sentiment, and
    wherein the ranking the plurality of product features comprises ranking, based at least in part on the first sentiment score and the second sentiment score, the first product feature above the second product feature.

11. A system for evaluating a plurality of product features, the system comprising:
    a memory;
    a processor in communication with the memory, the processor configured to perform a method comprising:
    ingesting, by the processor using natural language processing, product reviews for a plurality of products, wherein each product embodies a specific form for each of the plurality of product features, and wherein the ingesting, by the processor using natural language processing, the product reviews comprises:
       converting, by a tokenizer running on the processor, sequences of characters within the product reviews into sequences of tokens by identifying word boundaries in the product reviews;

determining, by a part-of-speech tagger running on the processor, a part of speech for each token and marking each token with its part of speech;

identifying, by syntactic relationship identifier running on the processor, syntactic relationships amongst the tokens; and generating, by the processor and based on the identified syntactic relationships, parse trees for the product reviews;

analyzing, by the processor, the ingested product reviews for sentiments associated with the specific forms;

generating, based on the analyzing and by the processor, a sentiment score for each product feature; and ranking, based on the sentiment scores and by the processor, the plurality of product features.

12. The system of claim 11, wherein the analyzing the ingested product reviews comprises:

identifying, in an ingested product review for a first product embodying a first specific form for a first product feature, a relatively strong positive sentiment associated with the first specific form; and identifying, in an ingested product review for a second product embodying a second specific form for the first product feature, a relatively strong negative sentiment associated with the second specific form, wherein the relatively strong positive sentiment and the relatively strong negative sentiment both cause a sentiment score for the first product feature to be higher.

13. The system of claim 11, wherein each sentiment score is a measure of relative importance for an associated product feature as compared to other product features and not a measure of relative importance for one specific form of the associated product feature as compared to other specific forms of the associated product feature.

14. The system of claim 11, wherein the method further comprises:

identifying a highest-ranking product feature from the ranked plurality of product features;

generating a quality score for each product based on a specific form of the highest-ranking product feature embodied within that product;

ranking, based on quality score, the plurality of products; and publishing each quality score in association with evidence relied upon to generate the quality score.

15. The system of claim 11, wherein the ingesting the product reviews comprises ingesting a first product review for a first product, the first product including a first specific form for a first product feature and a second specific form for a second product feature, wherein the ingesting the product reviews further comprises ingesting a second product review for a second product, the second product including a third specific form for the first product feature and a fourth specific form for the second product feature, wherein the analyzing the ingested product reviews comprises determining that the first product review has a first polarity of sentiment associated with the first specific form and a second polarity of sentiment associated with the second specific form, wherein the analyzing the ingested product reviews further comprises determining that the second product review has a third polarity of sentiment associated with the third specific form and a fourth polarity of sentiment associated with the fourth specific form, wherein the generating the sentiment score for each product feature comprises generating a first sentiment score for the first product feature based on the first polarity of sentiment and the third polarity of sentiment, wherein the generating the sentiment score for each product feature further comprises generating a second sentiment score for the second product feature based on the second polarity of sentiment and the fourth polarity of sentiment, and wherein the ranking the plurality of product features comprises ranking, based at least in part on the first sentiment score and the second sentiment score, the first product feature above the second product feature.

16. The system of claim 11, wherein the analyzing the ingested product reviews for the sentiments associated with the specific forms comprises:

analyzing, by the processor, the generated parse trees to identify associations between subject specific forms and predicate sentiments.

17. A computer program product for evaluating a plurality of product features, the computer program product comprising a computer readable storage medium having program instructions embodied therewith, the program instructions executable by a processor to cause the processor to perform a method comprising:

ingesting, by the processor using natural language processing, product reviews for a plurality of products, wherein each product embodies a specific form for each of the plurality of product features, and wherein the ingesting, by the processor using natural language processing, the product reviews comprises:

converting, by a tokenizer running on the processor, sequences of characters within the product reviews into sequences of tokens by identifying word boundaries in the product reviews;

determining, by a part-of-speech tagger running on the processor, a part of speech for each token and marking each token with its part of speech;

identifying, by syntactic relationship identifier running on the processor, syntactic relationships amongst the tokens; and generating, by the processor and based on the identified syntactic relationships, parse trees for the product reviews;

analyzing, by the processor, the ingested product reviews for sentiments associated with the specific forms;

generating, based on the analyzing and by the processor, a sentiment score for each product feature; and ranking, based on the sentiment scores and by the processor, the plurality of product features.

18. The computer program product of claim 17, wherein the analyzing the ingested product reviews comprises:

identifying, in an ingested product review for a first product embodying a first specific form for a first product feature, a relatively strong positive sentiment associated with the first specific form; and identifying, in an ingested product review for a second product embodying a second specific form for the first product feature, a relatively strong negative sentiment associated with the second specific form, wherein the relatively strong positive sentiment and the relatively strong negative sentiment both cause a sentiment score for the first product feature to be higher.

19. The computer program product of claim 17,
wherein the ingesting the product reviews comprises ingesting a first product review for a first product, the first product including a first specific form for a first product feature and a second specific form for a second product feature,
wherein the ingesting the product reviews further comprises ingesting a second product review for a second product, the second product including a third specific form for the first product feature and a fourth specific form for the second product feature,
wherein the analyzing the ingested product reviews comprises determining that the first product review has a first polarity of sentiment associated with the first specific form and a second polarity of sentiment associated with the second specific form,
wherein the analyzing the ingested product reviews further comprises determining that the second product review has a third polarity of sentiment associated with the third specific form and a fourth polarity of sentiment associated with the fourth specific form,
wherein the generating the sentiment score for each product feature comprises generating a first sentiment score for the first product feature based on the first polarity of sentiment and the third polarity of sentiment,
wherein the generating the sentiment score for each product feature further comprises generating a second sentiment score for the second product feature based on the second polarity of sentiment and the fourth polarity of sentiment, and
wherein the ranking the plurality of product features comprises ranking, based at least in part on the first sentiment score and the second sentiment score, the first product feature above the second product feature.

20. The computer program product of claim 17, wherein the analyzing the ingested product reviews for the sentiments associated with the specific forms comprises:
analyzing, by the processor, the generated parse trees to identify associations between subject specific forms and predicate sentiments.

* * * * *